United States Patent

Hässlin et al.

[11] Patent Number: 5,866,153
[45] Date of Patent: Feb. 2, 1999

[54] PROCESS FOR THE PREPARATION OF MICROCAPSULES

[75] Inventors: Hans Walter Hässlin, Grenzach-Wyhlen, Germany; Michael James Hopkinson, Pleasant Garden, N.C.

[73] Assignee: Novartis Corporation, Summit, N.J.

[21] Appl. No.: 512,427

[22] Filed: Aug. 8, 1995

Related U.S. Application Data

[63] Continuation-in-part of Ser. No. 333,941, Nov. 3, 1994, abandoned, which is a continuation of Ser. No. 14,972, Feb. 9, 1993, abandoned.

[51] Int. Cl.$^6$ .................................................. A01N 25/34
[52] U.S. Cl. .................. 424/408; 424/417; 424/409; 424/489; 424/484; 264/4.1; 264/4.7
[58] Field of Search .................................... 424/484, 408, 424/409, 405; 514/117; 264/4.1, 4.7; 252/316; 71/112

[56] References Cited

U.S. PATENT DOCUMENTS

| | | | |
|---|---|---|---|
| 3,948,636 | 4/1976 | Marks | 71/112 |
| 4,244,836 | 1/1981 | Frensch et al. | 252/316 |
| 4,643,764 | 2/1987 | Scher . | |
| 4,936,901 | 6/1990 | Surgant et al. . | |
| 4,938,797 | 7/1990 | Hässlin et al. . | |
| 5,229,122 | 7/1993 | Chadwick et al. | 424/408 |
| 5,354,742 | 10/1994 | Deming et al. | 514/117 |
| 5,500,219 | 3/1996 | Utz et al. | 424/409 |

FOREIGN PATENT DOCUMENTS

| | | |
|---|---|---|
| 0148149 | 7/1985 | European Pat. Off. . |
| 0278878 | 8/1988 | European Pat. Off. . |
| 1371179 | 10/1974 | United Kingdom . |

*Primary Examiner*—Thurman K. Page
*Assistant Examiner*—William E. Benston, Jr.
*Attorney, Agent, or Firm*—Marla J. Mathias; William A. Teoli, Jr.

[57] ABSTRACT

The invention relates to a process for the preparation of an aqueous suspension of microcapsules having a capsule wall of polyurea and encapsulating a water-immiscible pesticide, by dispersing a solution of a polyisocyanate in the sparingly water-soluble pesticide in water and subsequently reacting the dispersion with a polyamine, which process comprises effecting the dispersion of the solution of the polyisocyanate in the sparingly water-soluble pesticide in water and the subsequent reaction of the dispersion with the polyamine in the presence of at least one water-soluble or water-dispersible nonionic surfactant of a block copolymer having at least one hydrophobic block and at least one hydrophilic block.

19 Claims, No Drawings

PROCESS FOR THE PREPARATION OF MICROCAPSULES

This is a continuation-in-part of Ser. No. 08/333,941, filed Nov. 3, 1994, abandoned which is a continuation of Ser. No. 08/014,972, filed Feb. 9, 1993, now abandoned.

The present invention relates to a process for the preparation of microcapsules having a capsule wall of polyurea and encapsulating a water-immiscible pesticide, by interfacial reaction of an aqueous dispersion of a solution of a polyisocyanate in the water-immiscible pesticide and an aqueous solution of a polyamine.

It is known per se to prepare microcapsules by interfacial reaction in a dispersion, with one of the reactive components required to form the capsule wall being dissolved in the disperse phase and the other being dissolved in the continuous phase.

A process for the preparation of microcapsules encapsulating a pesticidal compound and having a capsule wall of polyurea is described, for example, in U.S. Pat. No. 4,938,797. The process is characterised by the reaction of the aqueous dispersion of a solution of a polyisocyanate in a pesticidal compound which is sparingly soluble in water with an aqueous solution of a polyamine in the presence of a mixture of at least one anionic dispersant and a nonionic protective colloid and/or a nonionic surfactant.

U.S. Pat. No. 4,563,212 describes a similar encapsulation process in which an emulsifier is used which emulsifier comprises sulfonated naphthalene formaldehyde condensates. This publication is silent on the use of nonionic protective colloids and nonionic surfactants.

Despite the numerous technical improvements in this area, there remains a need for a process to prepare microcapsules which is ecologically and economically more acceptable.

It is an object of the present invention to provide an ecologically more acceptable process by avoiding the use of anionic dispersants which are often poorly degradable. It is a further object of the present invention to provide a simpler process while achieving an equally high concentration of active substance as that achieved in prior art processes and the same, or slightly improved, efficacy. The process according to the invention uses fewer ingredients and is therefore economically more attractive. Further advantages for the use of block copolymer surfactants are that their chemical compositions are well characterised, and their biological degradation is more easy to monitor.

Accordingly, the present invention relates to a process for the preparation of an aqueous suspension of microcapsules having a capsule wall of polyurea and encapsulating a water-immiscible pesticide, by dispersing a solution of a polyisocyanate in the sparingly water-soluble pesticide in water and subsequently reacting the dispersion with a polyamine, which process comprises effecting the dispersion of the solution of the polyisocyanate in the sparingly water-soluble pesticide in water and the subsequent reaction of the dispersion with the polyamine in the presence of at least one water-soluble or water-dispersible nonionic surfactant of a block copolymer having at least one hydrophobic block and at least one hydrophilic block.

The successful working of the above process is surprising in view of the complete absence of an anionic dispersant. The presence of an anionic dispersant had been considered essential to achieve satisfactory microencapsulation.

Suitable nonionic surfactants are in general nonionic water-soluble polymers having an average molecular weight of between 1,000 and 250,000 daltons, preferably between 5,000 and 25,000 daltons. Such surfactants generally have a block structure and may be represented by the formulae

A-B-A,

A-B, or

-(A-B)$_n$- where n is an integer between 1 and 5, and where

A represents at least one hydrophilic block, and

B represents at least one hydrophobic block.

Examples of hydrophilic blocks (A) with their respective abbreviations in brackets are as follows:

Polyethyleneglycol (POE), polyvinylpyrrolidone (PVP), polyvinyl alcohol (PVA), polyhydroxyethylcellulose (PHEC), polyvinylmethylether (PVME), hydroxypropylcellulose (HPC), polyhydroxyethylmethacrylate (PHEMA), polyethyleneimine (PEI) and ethylhydroxyethylcellulose (EHEC).

Examples of hydrophobic blocks (B) with their respective abbreviations in brackets are as follows:

Polyoxypropylene (POP), polyvinylacetate (PVAc), polystyrene (PS), polyoxybutylene (POB), polyisoprene (PIP), polybutadiene (PBD), polyvinylchloride (PVC), polyalkylvinylpyrrolidone, polydimethylsiloxane (PDMS), polyalkylacrylate (PAA), polyalkylmethacrylate (PAM), ethylcellulose and poly(alkyl)etheroles.

An example of PAM is polymethylmethacrylate (PMMA).

The term alkyl in the above hydrophobic blocks, polyalkylvinylpyrrolidone, PAA, PAM and poly(alkyl) etheroles, is understood to represent $C_1$–$C_{16}$-alkyl, preferably $C_1$–$C_8$-alkyl, and can be linear or branched. Examples are methyl, ethyl, and the isomers of propyl, butyl, pentyl, hexyl, heptyl and octyl.

The nonionic surfactants suitable in the practise of the present invention may be in liquid, paste or solid form.

Preferred block copolymers can be represented as follows (g means graft):

PVP-PVAc available commercially as LUVISKOL (BASF), PVP-VA-types available commercially from GAF, POE-POP-POE available commercially as PLURONIC (BASF) or SYNPERONIC (ICI), (POE-POP)$_2$N—$CH_2$—$CH_2$—N(POP-POE)$_2$ available commercially as TETRONIC (BASF), POE-PDMS-POE available commercially from Goldschmidt, Essen, PMMA-g-POE available commercially as ATLOX (ICI), PVP-PS available commercially as ANTARA 430 (GAF).

Particularly preferred nonionic surfactants are the ethylene oxide/propylene oxide block copolymers available commercially under the tradename SYNPERONIC, e.g. SYNPERONIC PE F 108 which has a molecular weight of ca. 14,000 and a viscosity of 8,000 cP (as measured at 77° C. on a Brookfield viscometer at 6 rpm with a No. 2 spindle).

Within the scope of this invention, polyisocyanates will be generally understood as meaning those compounds that contain two and more isocyanate groups in the molecule. Preferred isocyanates are di- and triisocynates whose isocyanate groups may be linked to an aliphatic or aromatic moiety. Examples of suitable aliphatic diisocyanates are tetramethylene diisocyanate, pentamethylene diisocyanate and hexamethylene diisocyanate. Suitable aromatic isocyanates are toluylene diisocyanate (TDI: mixture of 2,4- and 2,6-isomers), diphenylmethane-4,4'-diisocyanate (MDI: DESMODUR® VL, Bayer), polymethylene polyphenylisocyanate (MONDUR® MR, Mobay Chemical Company); PAPI®, PAPI® 135 (Upjohn Co.), 2,4,4'-diphenyl ether trisocyanate, 3,3'-dimethyl-4,4'-diphenyl diisocyanate, 3,3'-dimethoxy-4,4'-diphenyl diisocyanate, 1,5-naphthylene diisocyanate and 4,4',4"-triphenylmethane triisocyanate. A further suitable diisocyanate is isophorone diisocyanate. Also suitable are adducts of diisocyanates with polyhydric alcohols such as ethylene glycol, glycerol and trimethylolpropane, obtained by addition, per mole of polyhydric alcohol, of a number of moles of diisocyanate corresponding to the number of hydroxyl groups of the respective alcohol. In this way several molecules of diisocyanate are linked through urethane groups to the polyhydric alcohol to form high molecular polyisocyanates. A particularly suitable product of this kind (DESMODUR® L) can be prepared by reacting 3 moles of toluylene diisocyanate with 1 mole of 2-ethylglycerol (1,1-bismethylolpropane). Further suitable products are obtained by addition of hexamethylene diisocyanate or isophorone diisocyanate with ethylene glycol or glycerol. Preferred polyisocyanates are diphenylmethane-4,4'-diisocyanate and polymethylene polyphenolisocyanate.

The di- and triisocyanates specified above can be employed individually or as mixtures of two or more such isocyanates.

Suitable polyamines within the scope of this invention will be understood as meaning in general those compounds that contain two and more amino groups in the molecule, which amino groups may be linked to aliphatic and aromatic moieties. Examples of suitable aliphatic polyamines are α,ω-diamines of the formulae

$H_2N[CH_2]_mNH_2$ or $H_2N[CH_2]_nCHR[CH_2]_oNH_2$ wherein m is an integer from 2 to 6, n is an integer from 0 to 5, o is an integer from 1 to 5 and R is $C_1$–$C_4$alkyl. Exemplary of such diamines are ethylenediamine, propylene-1,3-diamine, tetramethylenediamine, pentamethylenediamine, methylpentamethylenediamine and hexamethylenediamine. A preferred diamine is hexamethylenediamine. Further suitable aliphatic polyamines are polyethylenimines of the formula

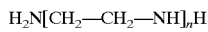

$H_2N[CH_2-CH_2-NH]_nH$ wherein n is an integer from 2 to 5. Representative examples of such polyethylenimines are: diethylenetriamine, triethylenetriamine, tetraethylenepentamine, pentaethylenehexamine.

Further suitable aliphatic polyamines are dioxaalkane-α,ω-diamines such as 4,9-dioxadodecane-1,12-diamine of formula

$H_2N(CH_2)_3O(CH_2)_4O(CH_2)_3NH_2.$

Examples of suitable aromatic polyamines are 1,3-phenylenediamine, 2,4-toluylenediamine, 4,4'-diaminodiphenylmethane, 1,5-diaminonaphthalene, 1,3,5-triaminobenzene, 2,4,6-triaminotoluene, 1,3,6-triaminonaphthalene, 2,4,4'-triaminodiphenyl ether, 3,4,5-triamino-1,2,4-triazole and 1,4,5,8-tetraaminoanthraquinone. Those polyamines which are insoluble or insufficiently soluble in water may be used as hydrochlorides.

Yet further suitable polyamines are those that contain sulfo or carboxyl groups in addition to the amino groups. Examples of such polyamines are 1,4-phenylenediaminesulfonic acid, 4,4'-diaminodiphenyl-2-sulfonic acid, or diaminomonocarboxylic acids such as ornithine and lysine.

The above polyamines may be used individually or as mixtures of two or more polyamines.

Suitable pesticides which may be formulated in the process of this invention are those which are insoluble in but stable to water, liquid at room temperature or have a melting point $\leq 60°$ C., or those that are soluble in a water-immiscible organic solvent, inert to isocyanates, and are able to dissolve polyisocyanates of the above specified kind.

Suitable water-immiscible solvents in which the pesticides may be dissolved are aliphatic and aromatic hydrocarbons such as hexane, cyclohexane, benzene, toluene, xylene, mineral oil or kerosin. Also suitable are cyclohexanone, as well as halogenated hydrocarbons such as methylene chloride, chloroform and o-dichlorobenzene. Suitable plant oils include castor oil, soybean oil and cottonseed oil. Mixtures of mono- and polyalkylated aromatics commercially available under the registered trademarks SOLVESSO® and SHELLSOL® are also suitable.

In the process of this invention, it is possible to formulate a very wide range of pesticides, for example herbicides, plant growth regulators, insecticides, acaricides, nematicides, fungicides, safeners and ectoparasiticides. With respect to their chemical constitution, these pesticides may belong to a very wide range of compound classes. Examples of compound classes to which the pesticides which can be formulated in the process of this invention may belong are: dinitroanilines, acylalanines, acylureas, triazole derivatives, carbamates, phosphoric acid esters, pyrethroids, benzilic acid esters, polycyclic halogenated hydrocarbons, formamidines and dihydro-1,3-thiazol-2-ylidene anilines. Examples of suitable individual compounds of the above mentioned compound classes are listed below. Where known, the common name is used to designate the individual compounds (q.v. the Pesticide Manual, 9th edition, British Crop Protection Council).

s-Triazines: Atrazin, Propazin, Terbutylazin, Ametryn, Aziprotryn, Desmetryn, Dipropetryn, Prometryn, Terbutryn, Secbumeton, Terbumeton, Cyromazin.

Ureas: Chlorobromuron, Chloroxuron, Chlorotoluron, Fluometuron, Metobromuron, Thiazafluron.

Acylureas: Teflubenzuron, Hexaflumuron, Diflubenzuron, Flufenoxuron, Lufenuron, Chlorfluazuron, Novaluron, Cymoxanyl.

Haloacetanilides: Dimethachlor, Metolachlor, Pretilachlor, 2-chloro-N-(1-methyl-2-methoxyethyl)-acet-2,6-xylidide, Alachlor, Butachlor, Propachlor, Dimethenamid.

Diphenyl ether derivates: Bifenox, 4-(4-Pentyn-1-yloxy) diphenylether, Acifluorfen, Oxyfluorfen, Fluoroglycofenethyl, Fomesafen, cis,trans-(±)2-ethyl-5-(4-phenoxyphenoxymethyl)-1,3-dioxolane.

Phenoxypropoionic acid derivatives: Fluazifop-butyl, Haloxyfop-methyl, Haloxyfop-(2-ethoxyethyl), Fluorotopic, Fenoxapropethyl, Quizalofop-ethyl, Propaquizafop, Diclofopmethyl.

Dinitroanilines: Butralin, Ethalfluralin, Fluchloralin, Isopropalin, Pendimethalin, Profluralin, Trifluralin.

Acylalanines: Furalaxyl, Metalaxyl, Benzoylprop ethyl, Flamprop methyl.

Triazole derivatives: Difenoconazole, Etaconazol, Propiconazole, 1-[2-(2,4-dichlorophenyl)-pent-1-yl]-1H-1,2,4triazole, Triadimefon, Epoxiconazole, Tebuconazole, Bromuconazole, Fenbuconazole, Cyproconazole, Penconazol, Metconazol,Tetraconazol, Fluquinconazol.

Carbamates: Dioxacarb, Furathiocarb, Aldicarb, Benomyl, 2-sec-butylphenylmethylcarbamate, Etiofencarb, Fenoxycarb, Isoprocarb, Propoxur, Carbetamid, Butylate, Di-allat, EPTC, Molinate, Thiobencarb, Tri-allate, Vernolate.

Phosphoric acid esters: Piperophos, Anilofos, Butamifos, Azamethiphos, Chlorfenvinphos, Dichlorvos, Diazinon, Methidathion, Azinphos ethyl, Azinphos methyl, Chlorpyrifos, Chlorthiofos, Crotoxyphos, Cyanophos, Demeton, Dialifos, Dimethoate, Disulfoton, Etrimfos, Famphur, Flusulfothion, Fluthion, Fonofos, Formothion, Heptenophos, Isofenphos, Isoxathion, Malathion, Mephospholan, Mevinphos, Naled, Oxydemeton methyl, Oxydeprofos, Parathion, Phoxim, Pyrimiphos methyl, Profenofos, Propaphos, Propetamphos, Prothiophos, Quinalphos, Sulprofos, Phemephos, Terbufos, Triazophos, Trichloronate, Fenamipos, Isazophos, s-benzyl-o,o-diisopropylphosphorothioate, Edinphos, Pyrazophos.

Pyrethroids: Allethrin, Bioallethrin, Bioresmethrin, Cyhalotrin, Cypermethrin, α-Cypermethrin, φ-Cypennethrin, Deltamethrin, Fenpropathrin, Fenvalerate, s-Fenvalerate, Flucythrinate, Fluvalinate, Permethrin, Pyrethrine, Resmethrin, Tetramethrin, Tralomethrin, Ethophenprox, Cyfluthrin, Cycloprothrin, Tefluthrin, Flufenprox, Silafluofen, Bifenthrin, Fenfluthrin, Bromfenprox.

Benzilic acid esters: Brompropylate, Chlorbenzylate, Chlorpropylate.

Polycyclic halogenated hydrocarbons: Aldrin, Endosulfan.

Formamidines: Chlordimeform.

Dihydro-1,3-thiazol-2-ylidene-anilines: N-(2,3-Dihydro-3-methyl-1,3-thiazol-2-ylidene)-2,4-xilidine.

Miscellaneous: Methopren, Kinopren, Flupropimorph, Tridemorph, Bromoxynil, Crimidine, Bupyrimate, Sethoxydim, Chlorphenprop-methyl, Carboxin, Buthiobate, Arnithraz, Dicofol, Oxadiazon, Prochloraz, Propargite, Dicamba, Camphechlor, Chlorfenson, Diafenthiuron, Fenpiclonil, Fenpropimorph, Fenpropidin, Fludioxonil, Pymetrozine, Pyrifenox, Pyriproxyfen, Fenazaquin, Tebufenpyrad, Pyridaben, Fenproxymate, Pyrimidifen, Triazamate, Fipronil, Tebufenocide, 4-bromo-2-(4-chlorphenyl)-1-ethoxymethyl-5-trifluoromethylpyrrol-3-carbonitrile, Prochloraz.

The microcapsules which can be prepared by the process of this invention may contain the above specified pesticides individually or as combinations of two or more pesticides.

It may be advantageous to add one or more nonionic protective colloids to the reaction mixture in preparing microcapsules according to the process herein described.

Preferred nonionic protective colloids are polyvinyl alcohols with a viscosity of 4–60 cp (measured in 4% aqueous solutions at 20° C.), which have been prepared by saponification of polyvinyl acetate, with the degree of saponification being at least 60%, but preferably 80–95%. Suitable products of this kind are those commercially available under the registered trademark MOWIOL®.

The process of this invention for the preparation of microcapsules is conveniently carried out by first dissolving the nonionic surfactant and optionally a nonionic protective colloid in water and then adding a solution of one or more polyisocyanates of the aforementioned kind in one or more of the above specified pesticides or in a solution of one or more of these pesticidal compounds in a water-immiscible organic solvent, and stirring the mixture efficiently until a homogeneous dispersion is obtained. With continued stirring, one or more polyamines of the above indicated kind is added and the mixture is further stirred until the polyamine has reacted completely with the isocyanate. The polyamines are conveniently added as aqueous solution. High stirring rates are achieved with the use of a high-shear mixer, e.g. an Ystral T 20 mixer. Stirring is generally carried out at speeds of up to 20,000 rpm.

The process of this invention can be carried out at room temperature or at moderately elevated temperature. A suitable temperature range is from 10° to 75° C. It is preferred to carry out the process of this invention in the temperature range from 20° to 45° C.

The reaction time for the reaction of the polyisocyanate with the polyamine is normally from 2 to 30 minutes. The degree of conversion and the end of the reaction can be determined by titration of the free amine present in the aqueous phase.

The components required to form the capsule walls may generally be employed in an amount of 2.5 to 30% by weight, preferably 5 to 20% by weight, based on the material to be encapsulated. The material to be encapsulated may consist of one active ingredient or of a mixture of two or more active ingredients, or of a solution of an active ingredient or of a mixture of two or more active ingredients in a water-immiscible solvent. The amount of components required to form the capsule wall in each specific case depends primarily on the wall thickness of the capsules to be prepared and also on the capsule size.

The measurement of capsule size (median particle diameter) as well as the distribution of caspule sizes can be made using a CILAS 715 granulometer. The median particle diameter (MPD) is preferably between 1 and 30 $\mu$m, more preferably between 2 and 20 $\mu$m.

The wall material of the capsules may be between 2 and 30% by weight of the total capsule, preferably 5 to 20 weight-%, more preferably 5 to 15 weight-%.

The nonionic surfactant can be present in the reaction mixture in an amount 0.25 to 5%, preferably 0.5 to 3%, and more preferably 0.75 to 1.5% by weight with respect to the total weight of the reaction components.

If a nonionic protective colloid is included in the reaction mixture, an amount 0.1 to 2% by weight with respect to the total weight of the reaction components is generally sufficient.

In the process of this invention it is possible to prepare aqueous suspensions of microcapsules that contain 10 to 700 g of microcapsules per litre. The suspensions obtainable in the process of this invention preferably contain 200 to 600 g of microcapsules per litre; in case of a solid active ingredient, which has to be dissolved in a solvent, 10 to 300 g per liter.

The suspensions of microcapsules obtainable in the process of this invention are directly ready for use. However, for transportation and storage they can be stabilised by the addition of further ingredients such as surface-active agents, thickeners, antifoams and antifreeze agents. Colouring agents such as dyes or pigments may optionally be added in an amount up to 5 weight-% in relation to the microcapsules.

It is, however, also possible to separate the microcapsules from the directly obtained suspension by filtration or centrifugation and either to dry, e.g. by spray-drying, or convert them once more into a suspension. The microcapsules which have been isolated from the suspension and dried are in the form of a flowable powder that has a virtually unlimited shelf life.

The capsule suspensions prepared by the process of this invention are storage stable with a shelf life of up to several years.

Another object of the invention is a composition of microcapsules prepared according to the process herein described.

Another object of the invention is a composition comprising an aqueous suspension of microcapsules having a capsule wall of polyurea and encapsulating a water-immiscible pesticide, characterised in that the suspension is stabilised with an effective amount of a water-soluble or water-dispersible nonionic surfactant of a block copolymer having at least one hydrophobic block and at least one hydrophilic block.

Another object of the invention is the use of water-soluble or water-dispersible nonionic surfactants of block copolymers having at least one hydrophobic block and at least one hydrophilic block for the preparation of microcapsule dispersions.

A further object of the invention is a method of treating insect, disease or weed infestation in plants or seeds, regulating plant growth or treating pests on animals, by applying a pesticidally effective amount of the composition according to the invention to the plant locus, seeds or animal as desired.

The advantages of the process according to the invention are as follows:

a) no sulfonated dispersants are used;

b) a high concentration of active ingredient is achieved;

c) the reduction in ingredients used leads to a simpler and more economical process;

d) there is no reduction in efficacy of the compositions.

The following Examples illustrate the invention in more detail. An Ystral T 20 high shear mixer is used for emulsification. MPD: median particle diameter

EXAMPLE 1

1.6 g Synperonic PE F 108 are dissolved in 71.1 g water in a beaker. In a second beaker 10 g Solvesso, 7.0 g epoxidised soybean oil and 5.4 g diphenylmethane-4,4'-diisocyanate (MDI) are dissolved in 48 g technical Diazinon. This solution is emulsified in the aqueous phase at 5,000 rpm for 1 to 2 minutes. Then 2.2 g 1,6-hexamethylenediamine (HMDA) are added as a 60% aqueous solution. Gentle stirring is continued for 3 to 4 hours. The resulting capsule suspension has a low viscosity of about 50 mPa.s, a median particle diameter (MPD) 15 to 25 µm, and 315 g active ingredient per liter.

EXAMPLE 2

Example 1 is repeated but 3.2 g Synperonic PE F 108 are used and 69.5 g water. The resulting capsule suspension has similar properties i.e. low viscosity and a MPD of about 20 µm.

EXAMPLE 3

1.6 g Synperonic PE F 108 are dissolved in 61.6 g water in a beaker. In a second beaker 6.4 g epoxidised soybean oil and 6.3 g MDI are dissolved in 80 g technical Diazinon. This organic phase is emulsified in the aqueous phase at 12,000 rpm for 1 to 2 minutes. 2.6 g HMDA are added as a 60% aqueous solution and stirring is continued gently for 1 to 2 hours. The resulting capsule suspension has a viscosity of 200 to 400 mPa.s, a MPD of 3 to 4 µm and 510 g active ingredient/l.

EXAMPLE 4

Example 3 is repeated but 3.2 g Synperonic PE F 108 are used, 60.6 g water and emulsifying at 15,000 rpm. The resulting capsule suspension has a somewhat higher viscosity (400 to 600 mPa.s) and a MPD of about 2 µm.

EXAMPLE 5

1.6 g Synperonic PE F 108 are dissolved in 69.5 g water in a beaker. In a second beaker 6.5 g MDI are dissolved in 83 g technical Isazofos. This organic phase is emulsified in the aqueous phase at 18,000 rpm for 1 to 2 minutes. 2.7 g HMDA are added as a 60% aqueous solution and stirring is continued gently for about 1 hour. The resulting capsule suspension has a viscosity of 20 to 40 mPa.s, a MPD of about 3 µm and contains 520 g active ingredient/l.

EXAMPLE 6

Example 5 is repeated but 10.3 g MDI and 3.4 g HMDA are used and emulsification is conducted at 19,000 rpm. The resulting capsule suspension has a viscosity of 40 to 60 mPa.s and a MPD of 2.5 µm.

EXAMPLE 7

1.6 g Synperonic PE F 108, 8.0 g 1,2-propyleneglycol and 2.0 g Natrosol 250 HR are dissolved in 58.3 g water in a beaker. In a second beaker 5.7 g MDI are dissolved in 72.4 g technical Furathiocarb at 50° C. This organic phase is emulsified in the aqueous phase at 14,000 rpm for 2 minutes. 2.4 g HMDA are added as a 60% aqueous solution and stirring is continued gently for about 2 to 3 hours. The resulting capsule suspension has a viscosity of 200 to 400 mPa.s, a MPD of 3.5 to 4.0 µm and contains 475 g active ingredient/l.

EXAMPLE 8

Example 7 is repeated but 8.9 g MDI, 3.7 g HMDA and 65 g water are used and emulsification is performed at 12,000 rpm. The resulting capsule suspension has a viscosity of 200 to 300 mPa.s and a MPD of 4 µm.

EXAMPLE 9

1.6 g Synperonic PE F 108 are dissolved in 69.5 g water in a beaker. In a second beaker 6.9 g MDI are dissolved in 87.8 g technical Metolachlor. This organic phase is emulsified in the aqueous phase at 15,000 rpm for 1 to 2 minutes. 2.9 g HMDA are added as a 60% aqueous solution and stirring is continued gently for about 1 hour. The resulting capsule suspension has a viscosity of 200 to 400 mPa.s, a MPD of 3 to 4 µm and contains 550 g active ingredient/l.

EXAMPLE 10

1.6 g Synperonic PE F 108, 0.3 g sodium hydroxide and 0.1 g Xantham Gum are dissolved in 73.9 g deionised water. In a second beaker 3.1 g MDI are dissolved in 21.9 g technical propiconazol and 62.1 g technical fenpropidin. The second mixture is emulsified in the aqueous solution at 15,000 rpm. 2.1 g hexamethylenediamine (60% aq. solution) are added and gentle stirring is continued for one hour. The resulting capsule suspension has a low viscosity (300 mPa.s) with MPD 2 to 3 µm.

EXAMPLE 11

Example 10 is repeated using additionally 8.0 g 1,2-propyleneglycol and reducing the amount of water by 8.0 g.

The resulting capsule suspension is low viscous (400 mPa.s) and has an MPD of 2 μm.

EXAMPLE 12

1.6 g Synperonic PE F 108, 0.3 g sodium hydroxide, 0.1 g Xantham Gum and 8.0 g 1,2-propyleneglycol are dissolved in 103.2 g deionised water. In a second beaker 1.8 g MDI are dissolved in 49.7 g technical fenpropidin. This solution is emulsified at 15,000 rpm. 1.3 g 1,6-hexamethylenediamine (60% aq. solution) are added and stirring is continued for about one hour. The resulting capsule suspension has a low viscosity (40 mPa.s) with MPD of 4–5 μm.

EXAMPLE 13

1.6 g Synperonic PE F 108, 0.3 g sodium hydroxide, 0.1 g Xantham Gum and 8.0 g 1,2-propyleneglycol are dissolved in 73.9 g deionised water. In a second beaker 2.6 g MDI are dissolved in 49.7 g technical propiconazol. This solution is emulsified in the aqueous solution at 15,000 rpm. 1.3 g 1,6-hexamethylenediamine (60% aq. solution) are added and stirring is continued for about one hour. The resulting capsule suspension has a low viscosity (100 mPa.s) with MPD 7 to 8 μm.

EXAMPLE 14

1.6 g Tetronic 908 are dissolved in 107.5 g deionised water. In a second beaker 3.9 g MDI are dissolved in 49.3 g technical isazofos (97.4%). This organic phase is emulsified in the aqueous solution at 12,000 rpm. 1.6 g 1,6-hexamethylenediamine are added and gentle stirring continued for about one hour. The resulting capsule suspension has a MPD of 5 to 6 μm.

EXAMPLE 15

1.6 g Siliconoil VP 1632 (Goldschmidt Essen, FRG) are dissolved in 107.5 g deionized water. In a second beaker 3.9 g MDI are dissolved in 49.3 g technical Isazofos (97.4%). This organic phase is emulsified in the aqueous solution at 16,000 rpm. 1.6 g 1,6-hexamethylenediamine (60% aqueous solution) are added and gentle stirring continued for about 1 hour. The resulting capsule suspension has a MPD of 5–7 μm.

EXAMPLE 16

1.6 g Pluronic P 105 are dissolved in 107.5 g deionized water. In a second beaker 3.9 g MDI are dissolved in 49.3 g technical Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 3–4 μm.

EXAMPLE 17

1.6 g Pluronic F 38 are dissolved in 107.5 g deionized water. In a second beaker 3.9 g MDI are dissolved in 49.3 g technical Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 5–7 μm.

EXAMPLE 18

1.6 g Pluronic P 103 are dissolved in 107.5 g deionized water. In a second beaker 3.9 g MDI are dissolved in 49.3 g technical Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 6–8 μm immediately after preparation. Rapid agglomeration of the capsules is observed.

EXAMPLE 19

1.6 g PVP-VA S 630 are dissolved in 107.5 g deionized water. In a second beaker 3.9 g MDI are dissolved in 49.3 g technical Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 3–4 μm.

EXAMPLE 20

4.8 g ANTARA 430 are dissolved in 104.3 g deionized water. In a second beaker 3.9 g MDI are dissolved in 49.3 g technical Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 10–15 μm.

EXAMPLE 21

3.2 g PVP-VA E 335 are dissolved in 105.9 g deionized water. In a second beaker 3.9 g MDI are dissolved in 49.3 g technical Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 2 μm.

EXAMPLE 22

3.2 g PVP-VA E 535 are dissolved in 105.9 g deionized water. In a second beaker 3.9 g MDI are dissolved in 49.3 g techn. Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 2.2 μm.

EXAMPLE 23

3.2 g PVP-VA E 735 are dissolved in 105.9 g deionized water. In a second beaker 3.9 g MDI are dissolved in 49.3 g techn. Isazofos (97.4%). This organic phase is emulsified in the aqueous solution at 12,000 rpm. 1.6 g 1,6-hexamethylenediamine (60% aqueous solution) are added and gentle stirring continued for about 1 hour. The resulting capsule suspension has an MPD of 2.7 μm.

EXAMPLE 24

1. In a beaker 1.6 g Tetronic 908 are dissolved in 47.2 g deionized water. In a second beaker 4.2 g Epoxiconazole are dissolved in 88.7 g aromatic solvent 230 and mixed with 4.9 g MDI (4,4'-diphenylmethanediisocyanate). This second mixture is emulsified in the aqueous phase by means of a high shear mixer (YSTRAL-type) at 10'000 UPM for about 1 minute. Then 3.4 g 1,6-hexamethylenediamin (60% aq. solution) are added and stirring reduced. A low-viscuous suspension with an an MPD of 4–5 μm is formed, which remains free flowing even at 40°–45° C.

EXAMPLE 25

Example 24 is repeated by replacing TETRONIC 908 by AGRIMER VA6. Again a low-viscuous suspension with an MPD of 4–5 μm is formed remaining free flowing up to 45° C.

EXAMPLE 26

Comparative example according to the state of the art, using sulphonated dispersing agent (U.S. Pat. No. 4,563, 212)

1.6 g MORWET D 425 (a sodium salt of sulphonated naphthalene-formaldehyde condensate) are dissolved in 47.2 g water. In a second beaker 4.2 g Epoxiconazole are dissolved in 88.7 g aromatic solvent 230 and mixed with 4.9 g MDI. This second mixture is emulsified in the aqueous phase by means of a high shear mixer at 10'000 UPM for about 1 minute. Then 3.4 g 1,6-hexamethylenediamin (60% aq. solution) are added and stirring reduced. A rapid increase of viscosity is observed and the suspension completely thickens at 40° C. within a few hours. Particle-size immediately after preparation is about 5 μm.

The irreversible thickening is also observed at lower stirring speeds with increased particle sizes of up to 10 μm.

What is claimed is:

1. A process for the preparation of an aqueous suspension of microcapsules including a capsule wall of polyurea and encapsulating a water-immiscible pesticide selected from the group consisting of a herbicide, plant growth regulator, insecticide, acaricide, nematicide, fungicide, safener and ectoparasiticide, by dispersing a solution of a polyisocyanate in the sparingly water-soluble pesticide in water and subsequently reacting the dispersion with a polyamine, which process comprises effecting the dispersion of the solution of the polyisocyanate in the sparingly water-soluble pesticide in water and the subsequent reaction of the dispersion with the polyamine in the presence of at least one water-soluble or water-dispersible nonionic surfactant of a block copolymer having at least one hydrophobic block and at least one hydrophilic block and having an average molecular weight of between 1,000 and 250,000 daltons, wherein said nonionic surfactant has a block copolymer structure represented by the formulae (1), (2) or (3):

$$A\text{-}B\text{-}A \qquad (1),$$

$$A\text{-}B \qquad (2),$$

or $$\text{-}(A\text{-}B)_n\text{-} \qquad (3)$$

where n is an integer between 1 and 5, and where

A represents at least one hydrophilic block selected from the group consisting of polyethyleneglycol (POE), polyvinylpyrrolidone (PVP), polyvinyl alcohol (PVA), poly hydroxyethylcellulose (PHEC), polyvinylmethylether (PVME), hydroxypropylcellulose (HPC), polyhydroxyethylmethacrylate (PHEMA), polyethyleneimine (PEI) and ethylhydroxyethylcellulose (EHEC), and B represents at least one hydrophobic block selected from the group consisting of polyoxypropylene (POP), polyvinylacetate (PVAc), polystyrene (PS), polyoxybutylene (POB), polyisoprene (PIP), polybutadiene (PBD), polyvinylchloride (PVC), polyalkylvinylpyrrolidone, polydimethylsiloxane (PDMS), polyalkylacrylate (PAA), polyalkylmethacrylate (PAM), ethylcellulose and poly(alkyl)etheroles, said nonionic surfactant being present in the reaction mixture in an amount of about 0.25 to 5% by weight with respect to the total weight of the reaction components, and wherein said reaction is carried out substantially free of anionic dispersant.

2. A composition comprising an aqueous suspension of microcapsules having a capsule wall of polyurea and encapsulating a water-immiscible pesticide selected from the group consisting of a herbicide, plant growth regulator, insecticide, acaricide, nematicide, fungicide, safener and ectoparasiticide, characterized in that the suspension is stabilized with an effective amount of a water-soluble or water dispersible nonionic surfactant of a block coplymer having at least one hydrophobic block and at least one hydrophilic block and having an average molecular weight of between 1,000 and 250,000 daltons, wherein said nonionic surfactant has a block copolymer structure represented by the formulae (1), (2) or (3):

$$A\text{-}B\text{-}A \qquad (1),$$

$$A\text{-}B \qquad (2),$$

or $$\text{-}(A\text{-}B)_n\text{-} \qquad (3)$$

where n is an integer between 1 and 5, and where

A represents at least one hydrophilic block selected from the group consisting of polyethyleneglycol (POE), polyvinylpyrrolidone (PVP), polyvinyl alcohol (PVA), poly hydroxyethylcellulose (PHEC), polyvinylmethylether (PVME), hydroxypropylcellulose (HPC), polyhydroxyethylmethacrylate (PHEMA), polyethyleneimine (PEI) and ethylhydroxyethylcellulose (EHEC), and B represents at least one hydrophobic block selected from the group consisting of polyoxypropylene (POP), polyvinylacetate (PVAc), polystyrene (PS), polyoxybutylene (POB), polyisoprene (PIP), polybutadiene (PBD), polyvinylchloride (PVC), polyalkylvinylpyrrolidone, polydimethylsiloxane (PDMS), polyalkylacrylate (PM), polyalkylmethacrylate (PAM), ethylcellulose and poly(alkyl)etheroles, said nonionic surfactant being present in an amount of about 0.25 to 5% by weight with respect to the total weight of the composition, and wherein said composition is substantially free of anionic dispersant.

3. A process according to claim 1, wherein the nonionic surfactant has an average molecular weight of between 5,000 and 25,000 daltons.

4. A process according to claim 1, wherein alkyl in the polyalkylvinylpyrrolidone, PAA, PAM and poly(alkyl) etherole blocks represents linear or branched $C_1$–$C_{16}$-alkyl.

5. A process according to claim 1, wherein the nonionic surfactants are in liquid, paste or solid form.

6. A process according to claim 1, wherein the block copolymers are represented by PVP-PVAc, PVP-VA-types, POE-POP-POE, $(POE\text{-}POP)_2N\text{—}CH_2\text{—}CH_2\text{—}N(POP\text{-}POE)_2$, POE-PDMS-POE, PMMA-g-POE and PVP-PS.

7. A process according to claim 1, wherein the pesticide is selected from the group consisting of Diazinon, Isazofos, Furathiocarb, Metolachlor, Fenpropidin and Propiconazole.

8. A process according to claim 1, wherein the pesticide is Epoxiconazole.

9. A process according to claim 1, wherein the polyisocyanate is selected from the group consisting of tetramethylene diisocyanate, pentamethylene diisocyanate, hexamethylene diisocyanate, toluylene diisocyanate, diphenylmethane-4,4'-diisocyanate, polymethylene polyphenylisocyanate, 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate and 4,4',4"-triphenylmethane triisocyanate.

10. A process according to claim 1, wherein the polyamines are α,ω-diamines of the formulae

wherein m is an integer from 2 to 6, n is an integer from 0 to 5, o is an integer from 1 to 5 and R is $C_1$–$C_4$alkyl, or polyethylenimines of the formula

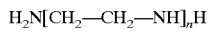

wherein n is an integer from 2 to 5, or dioxaalkane-α,ω-diamines such as 4,9-dioxadodecane-1,12-diamine of formula

11. A process according to claim 10, wherein the polyamine is selected from the group consisting of ethylenediamine, propylene-1,3-diamine, tetramethylenediamine, pentamethylenediamine, methylpentamethylenediamine, hexamethylenediamine, diethylenetriamine, triethylenetriamine, tetraethylenepentamine and pentaethylenehexamine.

12. A process according to claim 1, wherein the nonionic surfactant, and optionally a nonionic protective colloid, is dissolved in water and combined with a solution of one or more polyisocyanates in one or more of the pesticides or in a solution of one or more of these pesticidal compounds in a water-immiscible organic solvent, the mixture is stirred efficiently until a homogeneous dispersion is obtained, and with continued stirring, one or more polyamines is added and the mixture is further stirred until the polyamine has reacted completely with the isocyanate.

13. A process according to claim 12, wherein stirring is carried out at up to 20,000 rpm.

14. A process according to claim 1, wherein the reaction temperature is between 10° and 75° C.

15. A process according to claim 1, wherein the components required to form the capsule was are employed in an amount of 2.5 to 30% by weight based on the material to be encapsulated.

16. A process according to claim 1, wherein the median particle diameter of the capsules is between 1 and 30 μm.

17. A process according to claim 1, wherein the wall material of the capsules is between 2 and 30% by weight of the total capsule.

18. A composition of microcapsules prepared according to the process of claim 1.

19. A method of treating insect, disease or weed infestation in plants or seeds, regulating plant growth or treating pests on animals, by applying a pesticidally effective amount of the composition according to claim 18 to the plant locus, soil, seeds or animal as desired.

* * * * *